(12) United States Patent
Mikkelsen et al.

(10) Patent No.: US 9,591,494 B2
(45) Date of Patent: Mar. 7, 2017

(54) SELF-CARE SELF-TUNING WIRELESS COMMUNICATION SYSTEM

(71) Applicant: CARRIER IQ, INC., Sunnyvale, CA (US)

(72) Inventors: Frederick Mikkelsen, West Boylston, MA (US); Alberto Gutierrez, Jr., San Mateo, CA (US)

(73) Assignee: CARRIER IQ, INC., Sunnyvale, CA (US)

( * ) Notice: Subject to any disclaimer, the term of this patent is extended or adjusted under 35 U.S.C. 154(b) by 0 days.

(21) Appl. No.: 14/880,350

(22) Filed: Oct. 12, 2015

(65) Prior Publication Data

US 2016/0165460 A1    Jun. 9, 2016

Related U.S. Application Data

(63) Continuation-in-part of application No. 14/565,294, filed on Dec. 9, 2014.

(51) Int. Cl.

| | |
|---|---|
| *H04W 24/00* | (2009.01) |
| *H04W 24/02* | (2009.01) |
| *H04M 1/725* | (2006.01) |
| *H04W 8/20* | (2009.01) |
| *H04L 12/24* | (2006.01) |
| *G06Q 30/00* | (2012.01) |
| *H04W 4/00* | (2009.01) |

(Continued)

(52) U.S. Cl.
CPC ............ *H04W 24/02* (2013.01); *G06Q 30/01* (2013.01); *G06Q 30/016* (2013.01); *H04L 41/0803* (2013.01); *H04M 1/72519* (2013.01); *H04W 4/00* (2013.01); *H04W 8/20* (2013.01); *H04W 64/00* (2013.01); *G06Q 10/00* (2013.01)

(58) Field of Classification Search
CPC . H04M 1/72519; G06Q 30/01; G06Q 30/016; G06Q 10/00; H04W 4/00; H04W 64/00; H04W 8/20

See application file for complete search history.

(56) References Cited

U.S. PATENT DOCUMENTS

| | | | | |
|---|---|---|---|---|
| 8,315,623 | B1 * | 11/2012 | Flynn .................... | H04W 24/04 455/405 |
| 8,655,336 | B1 * | 2/2014 | Dempski ............. | H04L 41/5074 370/310.2 |

(Continued)

*Primary Examiner* — Keith Fang

(74) *Attorney, Agent, or Firm* — Workman Nydegger

(57) ABSTRACT

A customer self-service tuning system assists a mobile device user in adjusting his network settings and device configuration. Device, network and performance metrics are stored for a population. Over time all of these suggest changes in the device or network that change measured performance. The potential improvement(s) are presented to the user for selection. Performance measurements are taken and the user can choose to go forward with the new configuration or to revert. Each time a user requests self-care service, a new cohort is extracted from the then current overall population and analyzed for similarity to the user at that point in time. Each time an improvement is selected, the history of device states and network states is augmented. Identified variances are transformed into an action plan specific to a user and implemented on the device or network upon concurrence.

20 Claims, 14 Drawing Sheets

(51) Int. Cl.
*H04W 64/00* (2009.01)
*G06Q 10/00* (2012.01)

(56) References Cited

U.S. PATENT DOCUMENTS

| | | | | |
|---|---|---|---|---|
| 2009/0207019 A1* | 8/2009 | Nielsen | ............ | G06Q 10/06 340/540 |
| 2011/0275364 A1* | 11/2011 | Austin | ............ | H04L 41/12 455/423 |
| 2012/0315892 A1* | 12/2012 | Chin | ............ | H04B 7/0695 455/423 |

* cited by examiner

Check what applies to this care request

A list of summary description of requests for mobile device or services:

- dropped call
- poor coverage
- slow download
- battery problem
- application crashes
- phone screen freezes
- more Send Care Request

*Optionally user can choose one of the following before clicking on Send button:*
- Call me back at this time: *for user to enter date and time*
- Call me back now.

Figure. 1A

Thank you for your care request!

You care request ticket number is: [*Service Ticket ID*]. Please refer to it in the future. We have started investigation and will get back to you soon. We appreciate the opportunity to serve you.

Figure. 1B

Thank you for your care request!

You care request ticket number is: [*Service Ticket ID*]. Please refer to it in the future. The possible cause for the problem is [*description of diagnosis*]. [*405 customers experienced the same problem and fixed it by changing this configuration parameter*]. Please let us know if this solution works for you.

We appreciate the opportunity to serve you.

*Two buttons for user to decide on next steps:*

- Problem resolved!

- It didn't solve my problem. Continue investigate.

Figure. 1C

SELF-CARE SELF-TUNING WIRELESS COMMUNICATION SYSTEM

CROSS-REFERENCES TO RELATED APPLICATIONS

The present application is a continuation in part of currently pending application Ser. No. 14/565,294 filed Dec. 9, 2014 which is incorporated in its entirety, and also benefits from Ser. No. 13/653,313 which is incorporated by reference and its priority date Oct. 16, 2012.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISK OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

1. Technical Field

Customer support of cellular telephone devices.

2. Description of the Related Art

As is known, the following steps are conventionally performed before a service ticket is created with a Mobile Cellular Service Provider (the carrier): 1. Mobile subscriber calls in about request; 2. Subscriber waits on the line, often for 10 minutes; 3. Subscriber Service Representative (CSR) verifies device identification; 4. Subscriber describes the request; 5. CSR captures the request description in to a service ticket; 6. Once the service ticket is captured, the Service Provider can begin investigation. It often takes subscriber and CSR (two people) 30 minutes to complete creation of a service ticket. It can be appreciated that efficiency, accuracy, and customer service may be improved by eliminating manual and verbal steps, and extended periods on hold on the telephone.

BRIEF SUMMARY OF THE INVENTION

A customer self-service tuning system assists a mobile device user in adjusting his network settings and device configuration. Device state, network state, and performance metrics are stored for a population of devices. Changes in the device or network relate to changes in measured performance. When a user requests self-care service, a package of measurements and device state is uploaded to a service which also has access to the user's network account parameters. A cohort of users is selected from the overall population which meets two criteria: A member of the cohort was substantially similar in network state and device state (B_config) in the past to the present values of the user request; and its current device state, network state, and measured performance (A_config) is meaningfully distinguishable from the B_config. If desired, the changes to the B_config are suggested to the user or implemented remotely upon concurrence. Performance measurements are taken and the user may revert to the prior state. Over time the individual changes for each user are incorporated into the history of network states and device states for every cohort of users in the population. Each time a user requests self-care service, a new cohort is extracted from the then current overall population and analyzed for similarity to the user at that point in time. Each time an improvement is selected, the history of device states and network states is augmented. Each time a user is satisfied with improved performance in some dimension, the measured performance of a configuration is documented.

Raw data is being selected for real-time analysis upon every request. Identified variances are transformed into an action plan specific to a user and implemented on the device or network upon concurrence. The system presents one or more symptoms which may result from the misconfiguration. The user implements or agrees to changes which achieve a particular reconfiguration.

Devices and user choices overwrite original factory settings to meet local preferences, conditions, and usage. An analysis is made to find where a device diverges from its peers in operation. When a device is outside its cluster of substantially similar peers it may be improved by reconfiguration or replacement.

The server presents for confirmation by the user, one or more failed expectations which if perceived by the user are consistent with divergence from normal or most common configuration settings. From the divergences, the system extrapolates performance problems which are likely to result from the combination of settings. The user device displays one or more issues possibly related to the divergence from more common network and device configurations. User may select none, one, or more of the unsatisfactory system and device behaviors which match his own perception.

Subject to reversion, the network and device parameters are amended by the user under guidance by the self-service tuning system. A snapshot is taken to enable reversion if effects are not beneficial. With user permission, account and network settings are adjusted to be normal with respect to network location and radio environment. Prompted by the tuning system, user makes changes to his device settings.

BRIEF DESCRIPTION OF THE SEVERAL VIEWS OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIGS. 1A-1C illustrate Tap-once care requesting in one embodiment of the present invention;

DETAILED DISCLOSURE OF EMBODIMENTS OF THE INVENTION

Figure 2:
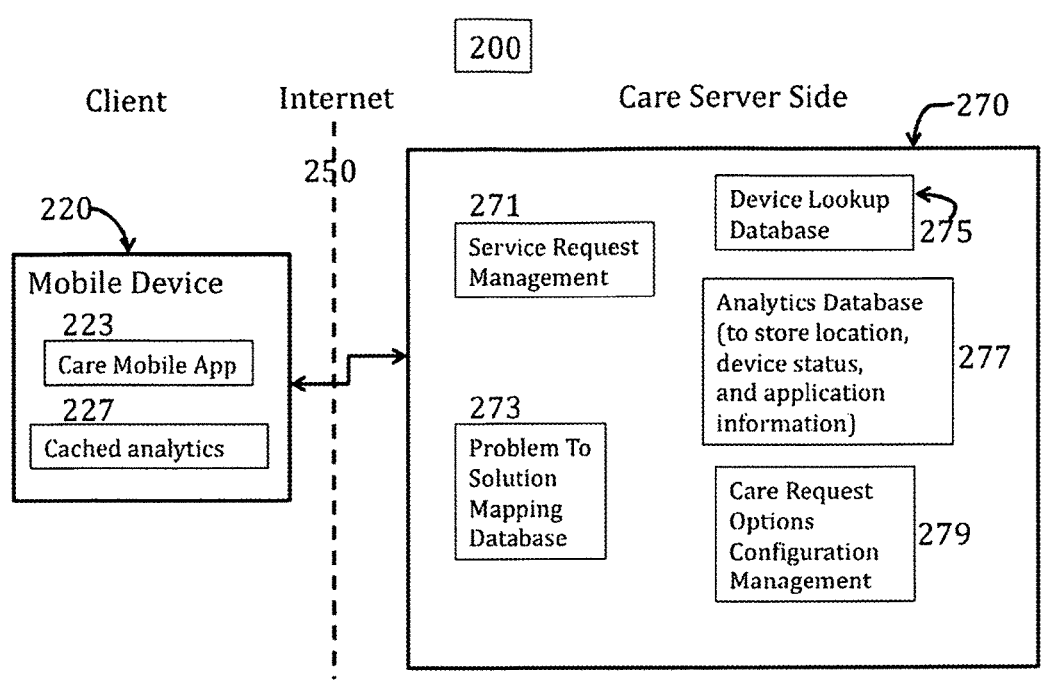
FIG. 2 is a system component diagram illustrating an embodiment of the present invention.

A customer self-service tuning system assists a mobile device user in adjusting his network settings and device configuration. From the time a user takes possession of a personal mobile device it is adapted to the network environment in which it operates, the professional role that the owner fulfills, social and recreational services subscribed to, and settings in the user interface. As geo-location and network locations change these may become suboptimal. And exploratory settings may be forgotten yet still affect the non-visible characteristics of the device.

The role that the owner has may change as life and job transitions occur. Simply restoring a phone to an earlier configuration may not improve the satisfaction of its owner/operator. Device state, network state, and performance metrics are stored for a population of devices. Over time all of these evolve which can be used to correlate changes in the device or network with changes in measured performance. When a user requests self-care service, a package of measurements and device state is uploaded to a service which also has access to the user's network account parameters. For a mobile device, location is a factor of interest because of the variability of network and physical environment.

A cohort of users is selected from the overall population which meets two criteria: in the past, each member of the cohort was substantially similar in network state and device state (B_config) to the present values of the user request; and at the time of request, the device state, network state, and measured performance (A_config) is meaningfully distinguishable from the device state, network state, and measured performance of B_config.

From this, specific changes in device state or in network state are associated with certain performance improvements, e.g. switching or selecting among radio technologies: 3G, LTE, Wi-Fi, location services, airplane mode, Bluetooth; installing or disabling applications: games, traffic, entertainment, investment.

The potential improvement(s) are presented to the user for selection or dismissal (when not my problem). If desired, the changes to the B_config are suggested to the user or implemented remotely upon concurrence. Performance measurements are again taken and the user may choose to go forward with the new configuration or revert to the prior state.

Over time the individual changes for each user are incorporated into the history of network states and device states for every cohort of users in the population. By population we refer to the entire subscriber base of a mobile operator from which the cohort populations are drawn. Each time a user requests self-care service, a new cohort is extracted from the then current overall population and analyzed for similarity to the user at that point in time. Each time an improvement is selected, the history of device states and network states is augmented. Each time a user is satisfied with improved performance in some dimension, the measured performance of a configuration is documented. Raw data is being selected for real-time analysis upon every request. Identified variances are transformed into an action plan specific to a user and implemented on the device or network upon concurrence. The invention is easily distinguished from applying key word searches in a conventional knowledge base to retrieve stored problem descriptions and their prescripted cures.

Device and network settings are compared with the most common equivalents to identify divergence from a local norm. Based on determining the modes of each distribution of settings in actual use among mobile devices operating in the same location, a "modal" network account is formed. Every actual user account will diverge from it in some way. But users who operate in a dense urban network environment with many sources of signal evolve to different sensitivities than a rural or mountainous terrain with weak or infrequent connections.

When a specific device has perceived shortcomings, and its network settings are statistically deviant from other devices in its cohort, it may be a source of trouble. Similarly, device settings can be compared to reveal an unexpected configuration with regard to devices of the same type and user demographic.

The system presents one or more symptoms which may result from the misconfiguration. Reversing the typical user customer support engagement, the automated system offers one or more symptoms of a suboptimal configuration extrapolating from the data uploaded from the device and from its account files. The user implements or agrees to changes which achieve a particular reconfiguration. Instead of bringing the device to a service center, a user may choose to change some of the settings immediately in the field, when detailed instructions are provided. Other adjustment can be made remotely from the device but only with consent.

User permissioned upload of device measurements and settings causes a server to identify divergences from the mode of network and device setting distributions selected from among other users having similar device configurations in similar network environments. Devices and user choices adapt original factory settings to meet local preferences, conditions, and usage. No two users are identical in their preferences and their usage and locations may cause a unique configuration.

An analysis is made to find where a device diverges from its peers in operation. But customers tend to largely cluster into groups having substantial similarities. A device is categorized to largely match one of the usage clusters. Then, among its cohorts, a detailed analysis surfaces setting that are inconsistent with the norm or modal values of the cluster. When a device is outside its cluster of substantially similar peers it may require reconfiguration or replacement. An analysis determines why this device is unlike the others who belong to a cohort of user demographics, hardware, and software configurations. It may be the device itself requires replacement. But in many cases there is no trouble found when the device is returned to factory settings at a service depot. Perhaps the device can be adjusted into the norm if a norm can be determined.

The server presents for confirmation by the user, one or more failed expectations which if perceived by the user are consistent with divergence from normal or most common configuration settings. Rather than burdening the user with a need to find a vocabulary for description, the service offers a menu of possible disappointment for which there are known remediations.

From the divergences, the system extrapolates performance problems which are likely to result from the combination of settings. The service determines significant divergence from the most common satisfactory configurations. Then the system projects the type of suboptimal performance the user would perceive from the divergent settings. The user device displays one or more issues possibly related to the divergence from more common network and device configurations. Downloaded to the devices are descriptions of suboptimal performance which are consistent with the device's divergence from modal configuration(s). In lieu of having a customer service representative attempt to understand and translate a user recitation of issues, the device provides a descriptive illustration of what the user might be experiencing.

User may select none, one, or more of the unsatisfactory system and device behaviors which match his own perception. When a user recognizes a symptom as one he has encountered, he may select it. Or the user may then add personal context or conditions which would improve the problem determination. Sometimes the additional information does not indicate a different diagnosis but allows the user a method of expressing urgency or irritation. Subject to reversion, the network and device parameters are amended by the user under guidance by the self-service tuning system. Depending on which device or system behaviors are to be remediated, the service guides the user to edit his settings. In some cases, the changes would be applied to the network. The user will be offered an opportunity to agree or disagree with the network based settings or preferences.

A snapshot is taken to enable reversion if effects are not beneficial. Rather than depending on a backup and restore of the entire device which may not affect the carrier's settings for the user account, a special snapshot is taken just of the device and network setting which will be affect by the proposed amendments. If after a time or upon a user selection, there has been no improvement in the device operation or performance, the user can revert the device state and network state back one full configuration.

With user permission, account and network settings are adjusted to be normal with respect to network location and radio environment. After obtaining permission from the user, the server modifies the account preferences, defaults, and parameters to converge toward the values of similar devices in the same geo-location or network environment. These will reflect the changes many other users have made from the factory settings. What is normal is what most people have found to be satisfactory.

Prompted by the tuning system, user makes changes to his device settings. Some settings are made at the device itself. The server guides the user through the steps and menus for changing the setting to reflect a suggested configuration. This also reflects what the cohort of similar devices and users have found to be acceptable. With step-by-step instructions, the user remains in control of the changes which can be selectively adopted or ignored.

The present invention provides a method and system for capturing and processing customer care request related to mobile device and/or wireless network service via mobile device and the Internet. The request is placed by a subscriber at a client system and received by a server system. The server system receives customer care related information that has been captured on the client. The server system then uses the information sent by the client to initiate a customer care request ticket and automatically respond to the client with ticket number and request description compiled using the information from the client. The care ticket summary will be sent to the mobile device with a link to an online care system for client to get details as needed.

One aspect of the invention is a method for operation of a self-care server including: initiating Self-care service Request; distinguishing user from cohort; confirming desired outcome with client; and supporting client trial changes and recovery; wherein initiating Self-care service Request comprises receiving user initiated request for assistance; wherein distinguishing user from cohort comprises determining cohort of substantially similar user population for client; wherein confirming desired outcome with client comprises retrieving expectation failures associated with divergences, and transmitting selectable problem descriptions to client display; and wherein supporting client trial changes and recovery comprises transmitting prompts to client to converge device settings.

In an embodiment initiating a self-care request also includes receiving device state; and reading network state for user account.

In an embodiment, distinguishing client from cohort also includes: determining modes for distribution of cohort settings; and determining divergences from "modal" configuration of client configuration.

In an embodiment, confirming desired outcome with client also includes: receiving one or more agreement selections from the mobile device; and storing prior device state and network state.

In an embodiment, supporting client trial changes and recovery also includes: upon client concurrence, adjusting network account settings; and upon a trigger offering to revert or continue operation with new settings.

Upon user selection: a. Application retrieves device information. b. Application retrieves geographic location. c. Application captures the user's description of the request. d. Application communicates to Service Provider.

In an embodiment, the service provider host system includes a circuit to receive a customer care request ticket; a circuit to apply analytics to the data recorded and transmitted by the wireless device; a circuit to determine a priority and suggested response; and a circuit to track requests and resolutions which may be queried or summarized. Each service provider may offer different levels of support or more sophisticated analytics. In an embodiment, the customer care ticket and start process server includes communications circuit to receive a package of data recorded at and transmitted from a wireless device; a circuit to compile a request description from the package and assign a customer care request ticket number; a circuit to return the customer care request ticket number to the wireless device with a link to the request description; a circuit to match customer care requests to known problems or previously received customer care requests; and a circuit to suggest actions or report the status of the wireless network.

Depending on the accumulated knowledge base or how chatty the customer care is configured, the level of feedback to the user may be taciturn or verbose. In an embodiment, each of the wireless devices coupled to the server has a user interface, operable by a single action; a circuit to record indicia of the state of the wireless device and its radio frequency environment triggered by the single action; coupled to a circuit to uniquely identify the wireless device and its location; coupled to a circuit to transform the recorded indicia and identification data into a package for eventual transmission; coupled to a communication processor to connect to the customer care ticket and start process server, whereby a user may initiate a request for support service at a time when the wireless device is out of range or out of touch with its network.

When the subscriber submits a request description through Tap-once-Care, the carrier can immediately correlate the subscriber with a set of known issues captured up-to-date. With Cached Analytics Delivery in Tap-once Care 1. Subscriber brings up application; 2. Application presents and receives user selection of a check box of the nature of the request, e.g. "dropped call", "poor coverage", "slow download", "battery problem", "application crashes", "phone screen freezes", "other"; 3. Upon user selection, a. Application retrieves device information. b. Application retrieves geographic location c. Application captures the user's description of the request and uploads corresponding cached analytics. d. Application communicates to Service Provider and creates Service Ticket on server side. e. Returns Service Ticket ID to the subscriber for future reference as well as the probable cause of the request that has been derived from the cached analytics. f. User has the option to accept the diagnosis, or have Service Provider continue the investigation; 4. The service provider can close the service ticket immediately if the user agrees, or begin investigation.

As necessary, the Internal Service System may trigger subsequent upload requests for additional cached analytics. With Root-Cause Screening, the Tap-once Care process becomes: Subscriber brings up application, Application presents and reads Subscriber selection of a check box of the nature of the request, e.g. "dropped call", "poor coverage", "slow download", "battery problem", "application crashes", "phone screen freezes", "other". Upon user selection, Application retrieves device information. Application retrieves geographic location if it has been captured on the mobile device. Application captures the user's description of the request. Application communicates to Service Provider and creates Service Ticket. The service provider correlates users complaint with experience for users in that geographic area based on captured network analytics, and provides an immediate probable cause. Returns Service Ticket ID to the subscriber for future reference as well as the probable cause of the request identified. User has the option to accept that diagnosis, or continue the ticket. The service provider can close the service ticket immediately if the subscriber agrees.

With Localized Feedback on Service: User brings up application. Application presents and receives User selection of a check box of the nature of the request, e.g. "dropped call", "poor coverage", "slow download", "battery problem", "application crashes", "phone screen freezes", "other". Upon user selection: Application retrieves device information. Application retrieves geographic location if it has been captured on the mobile device. Application captures the user's description of the request. If it is a common service request, the Service System returns a chart and information to describe how other users are fairing in that area, and asks the subscriber if this is sufficient. Subscriber can choose to identify "not sufficient", and the system can create a Service Ticket. The service provider can begin investigation.

Reference will now be made to the drawings to describe various aspects of exemplary embodiments of the invention. It should be understood that the drawings are diagrammatic and schematic representations of such exemplary embodiments and, accordingly, are not limiting of the scope of the present invention, nor are the drawings necessarily drawn to scale.

FIG. 1A is provided for expository but non-limiting purposes to convey the scope but not the limitation of the invention. The user may optionally select the urgency of receiving customer support. The user may select from a list of common complaints for efficiency and economy. The user may simply send the care request by tapping once.

FIGS. 1B and 1C are non-limiting exemplary displays which suggest two of the responses that a user may receive upon transmitting a service request. In the case of FIG. 1C the user may operate on buttons to direct next steps.

FIG. 2 illustrates system components in one embodiment of the present invention. The component of "Care Request Options Configuration Management" 279 in FIG. 2 is for configuring the list of care request options for user to choose from. The list can be configured based on mobile device make, model, firmware version, problems having been observed up-to-date etc.

The component of "Service Request Management" 271 in FIG. 2 manages life cycle of a service ticket from creation to close. It automatically creates a service ticket after receiving a service request from the client. It also communicates back to the client with the service ticket ID, probable causes and resolution.

The component of "Problem To Solution Mapping Database" 273 in FIG. 2 stores solutions mapped to solve corresponding problems. It can be used to generate resolution in automated response to a service request. The care server side 270 further comprises a device lookup database 275 stored in computer readable non-transitory storage and an analytics database 277 stored in computer readable non-transitory storage which stores location, device status, and application information. Within the Mobile Device 220, are cached analytics 227 in non-transitory computer readable media, and a care mobile app 223 which is enabled to capture the service request and read the cached analytics upon user initiation and to transmit the service request and cached analytics through the wireless media and internet 250 to the Care server side 270.

Figure 3:
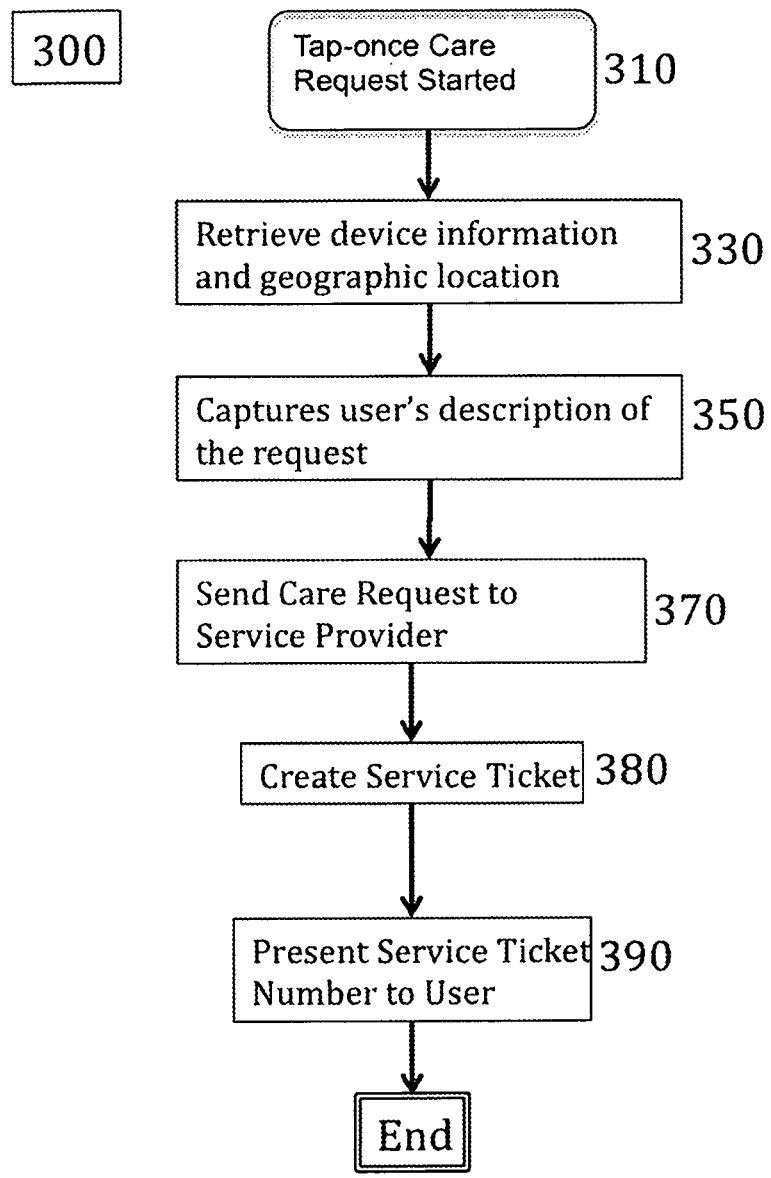
FIG. 3 is a flow diagram of a routine that enables Tap-once care request processing for a user.

FIG. 3 is a flowchart of a method. Step 310 initiates the process of tap-once care request: retrieving device information and geographic location 330; capturing user's description of the request 350; sending care request to the service provider 370; creating a service ticket 380; and presenting the service ticket number to the user 390.

Figure 4:
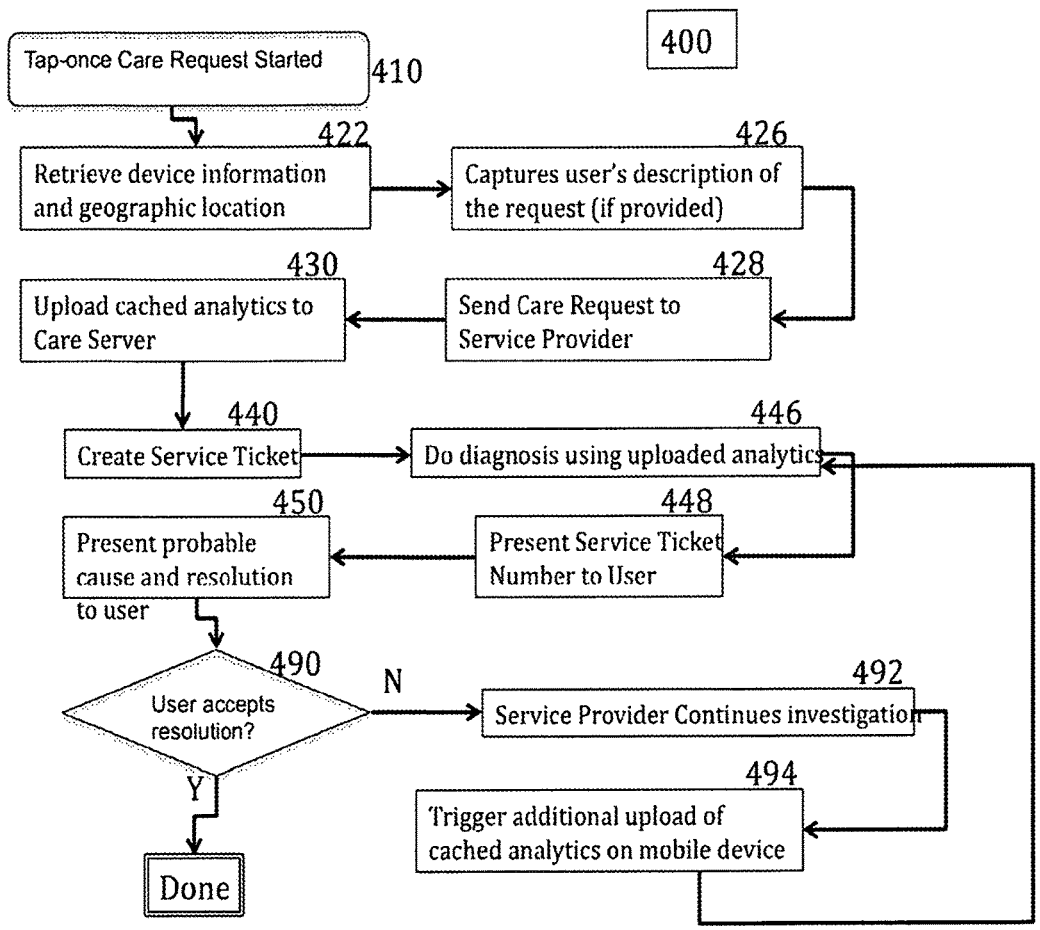
FIG. 4 is a flow diagram of a routine that enables Tap-once care request processing with cached analytics for a user.

FIG. 4 is a flowchart of a method. Step 410 initiates the process of the method: retrieving device information and geographic location 422; if the user provides description of the problem (for example as in FIG. 1A then capture user's description of the request 426; sending the care request to the service provider ("tap-once") 428; uploading cached analytics to care server 430; creating a service ticket 440; doing a diagnosis using uploaded analytics 446; presenting a service ticket number to the user 448; presenting a probable cause and resolution 450; upon user accepting resolution 490, Done 498; and upon user not accepting resolution, continuing investigation by the service provider 492 and triggering additional upload of cached analytics on mobile device 494.

Figure 5:
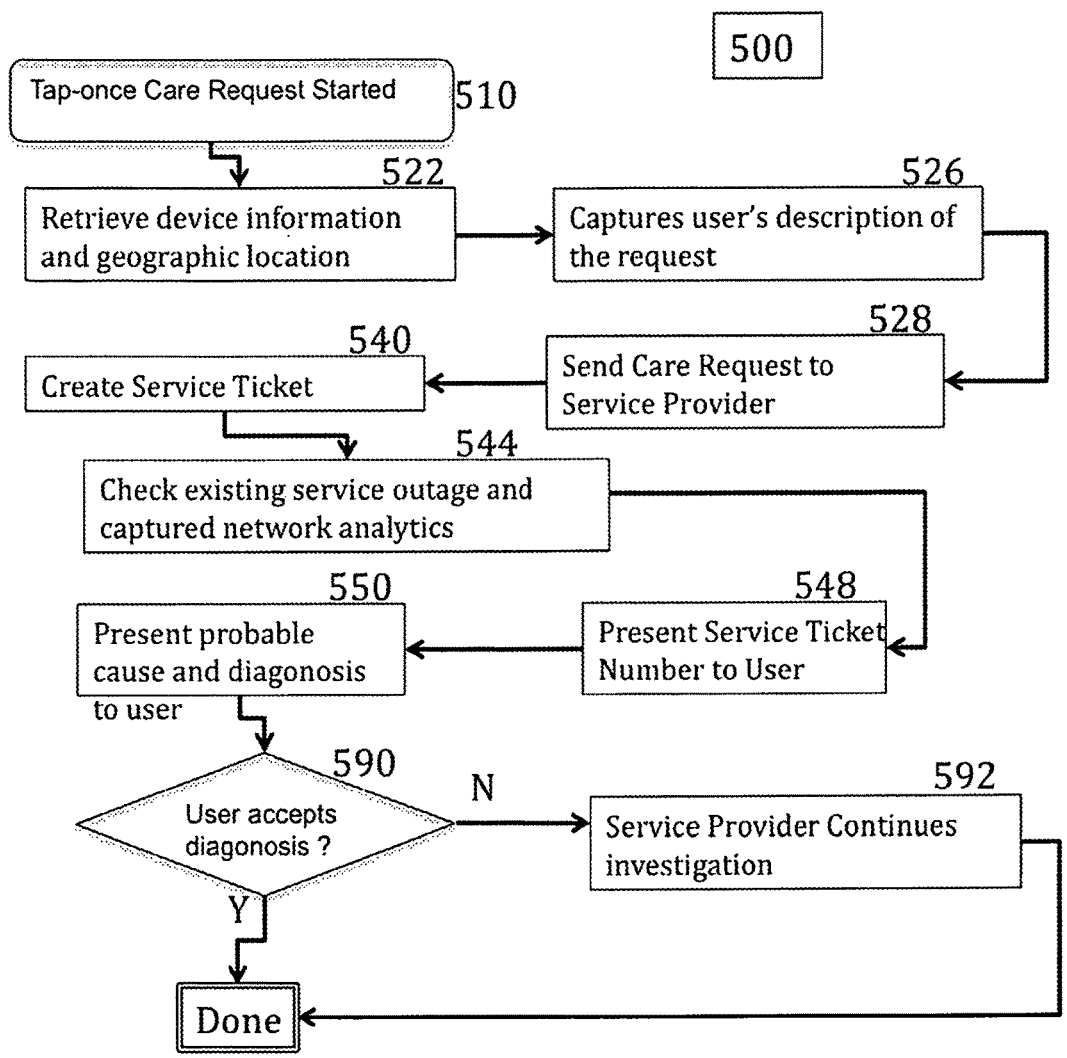
FIG. 5 is a flow diagram of a routine that enables Tap-once care request processing with root-cause screening for a user.

FIG. 5 is a flowchart of a method. Step 510 initiates the process of the method: retrieving device information and geographic location 522; capturing user's description of the request 526; sending the care request to the service provider 528; creating a service ticket 540; checking existing service outages and captured network analytics 544; presenting a service ticket number to the user 548; presenting a probable cause and diagnosis 550; upon user accepting diagnosis 590, Done; and upon user not accepting diagnosis, continuing investigation by the service provider 592.

Figure 6:
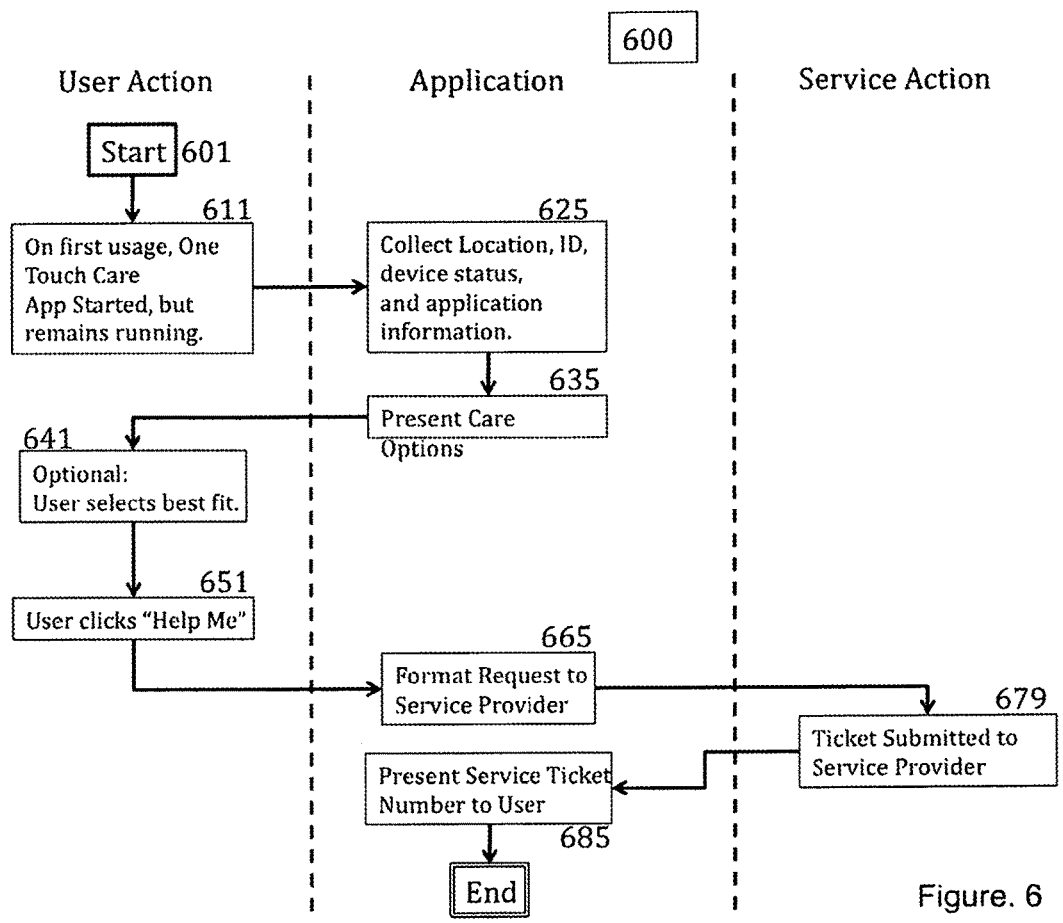
FIGS. 6-7 illustrate the presentations for user input and resulting transformations.

FIG. 6 illustrates a typical usage model of the invention: Step 601 initiates the method by user action; one touch care app starts and remains running 611; the application collects location, ID, device status, and application information 625; the application presents care options to the user 635; the user selects the best fit of the options presented on a display 641; the user clicks "help me" on the user interface 651; the application formats and transmits a request to the service provider 665; the server side submits a ticket to the service provider and obtains a number 679; and the application receives and presents the service ticket number to the user 685.

Figure 7:
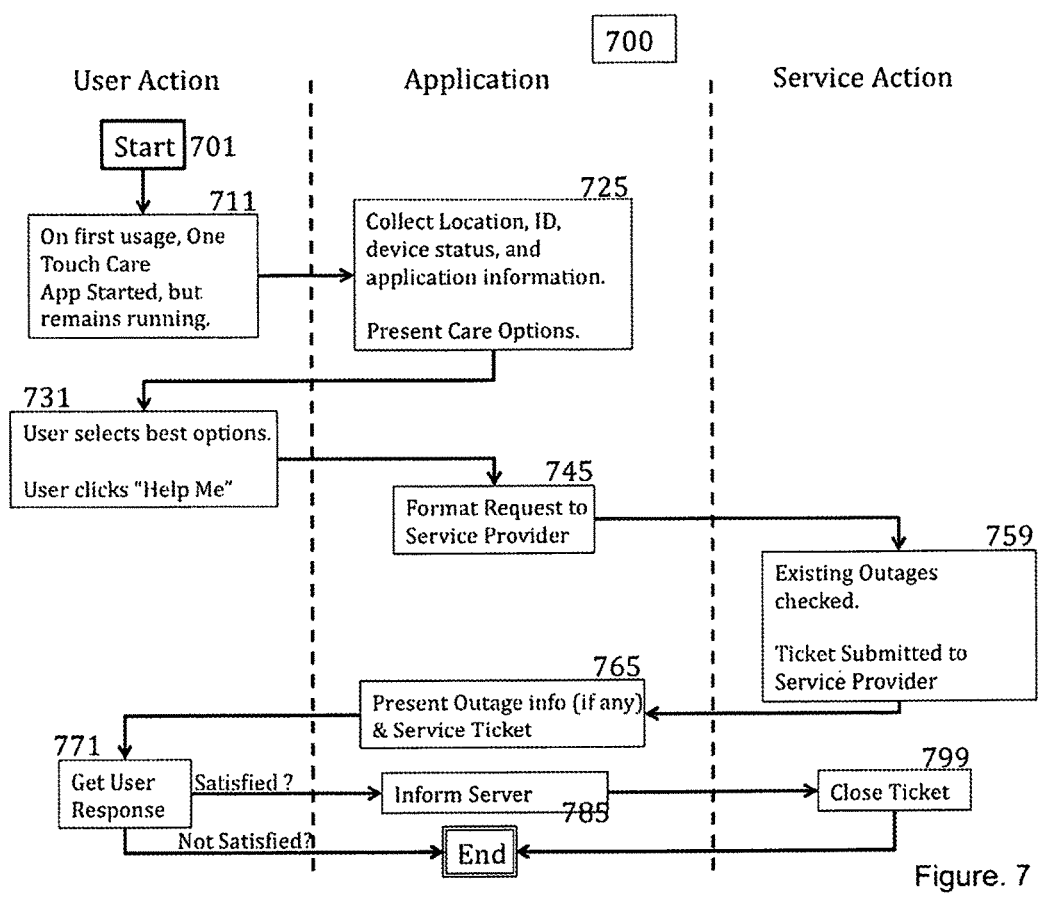

FIG. 7 illustrates an other usage model of the invention: Step 701 initiates the method by user action; one touch care app starts and remains running 711; the application collects location, ID, device status, and application information and presents Care Options to the user 725; the user selects best options and clicks "help me" on the user interface 731; the application formats and transmits a request to the service provider 745; the server side checks existing outages and submits a ticket to the service provider and obtains a service ticket number 759; the application receives and presents outage information and the service ticket number to the user 765; the user may select one of satisfied or not satisfied as a user response 771; on the condition that the user is satisfied, the application informs the server 785; and the server closes the ticket 799.

Figure 8:
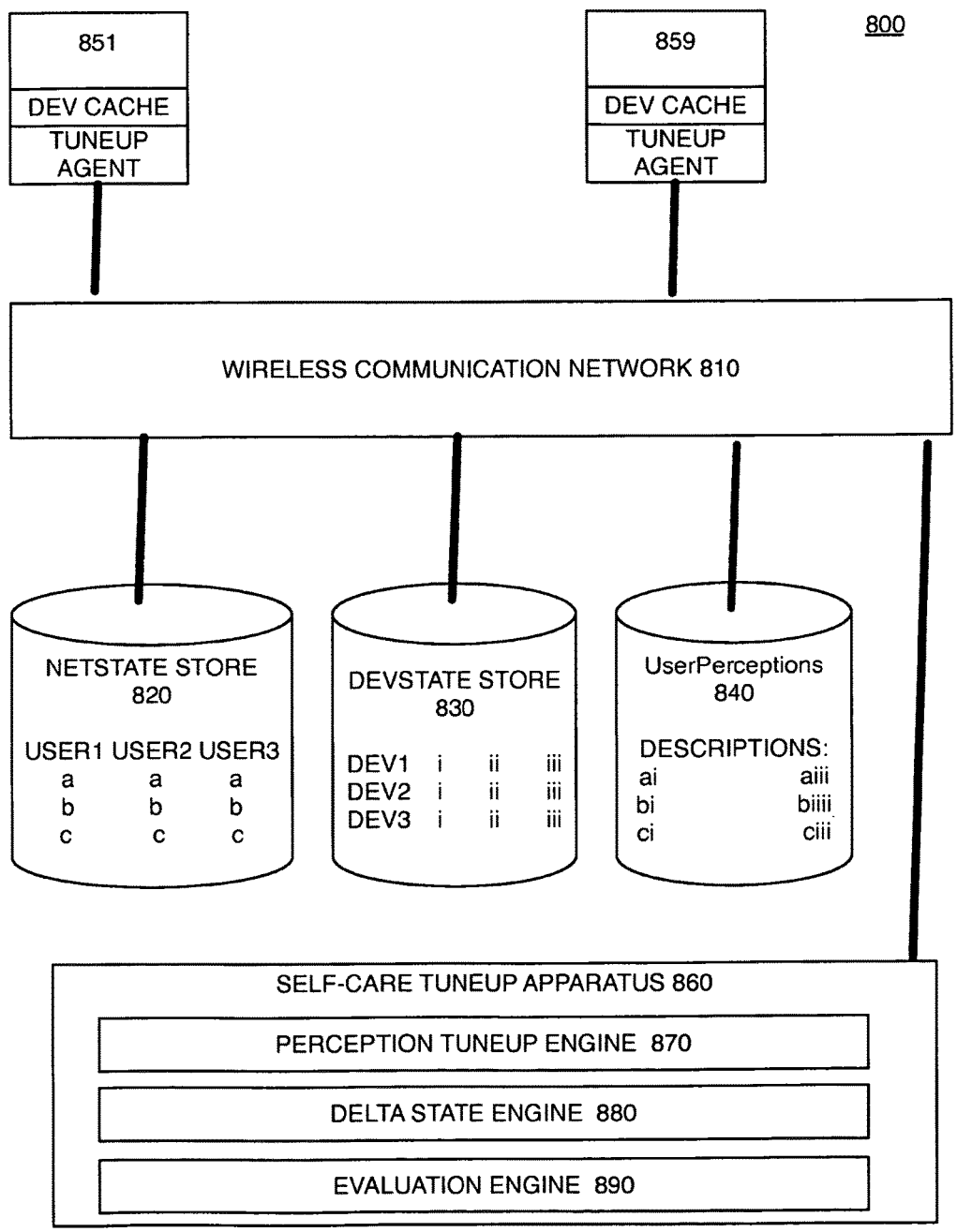
FIG. 8 is a block diagram of a system embodiment.

Another aspect of the subject matter of this application is a system embodiment illustrated in FIG. 8: the exemplary, non-limiting system 800 includes, a wireless communication network 810 provisioned and maintained by a network operator (NETOP): said network is communicatively coupled to the following apparatuses, a NetState store 820; a DevState store 830; a UserPerception store 840; and a plurality of mobile User Devices 851-859, each one of the User Devices having a hardware device state cache store and a TuneUp agent circuit.

In an embodiment the system also includes, a Self-Care TuneUp apparatus 860; communicatively coupled to network 810, the Self-Care TuneUp apparatus having the following circuits, a Perception::TuneUp Engine circuit 870; a Delta State Engine circuit 880; and an Evaluation Engine circuit 890.

Figure 9:
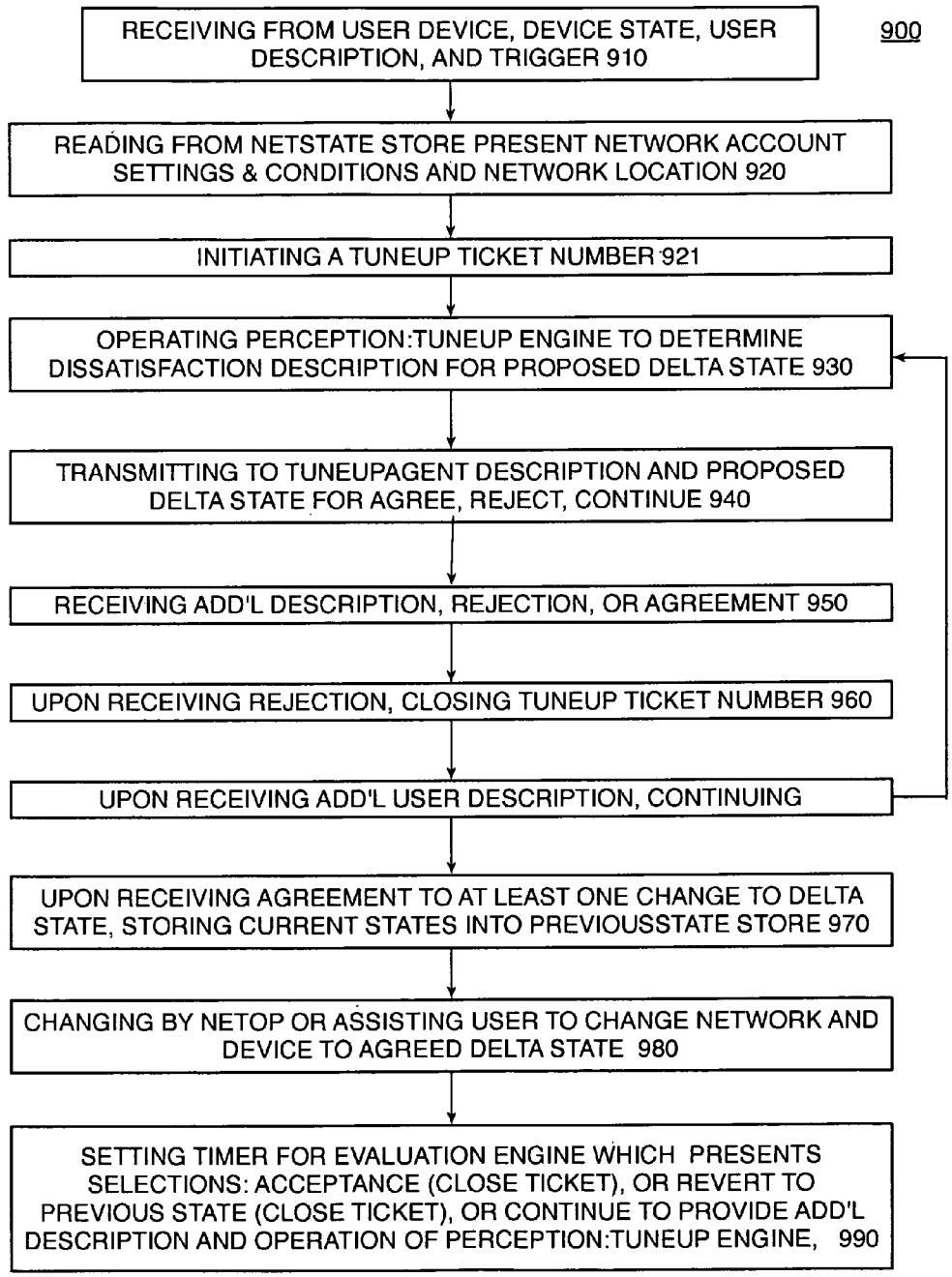
FIG. 9 is a flowchart of a method embodiment.

Another aspect of the subject matter is a computer-implemented method 900 of FIG. 9 for causing a processor, communicatively coupled to a plurality of wireless mobile devices, to perform steps which include, receiving a device state, user description, and a trigger from a mobile user device coupled to wireless communication network 910; reading the present settings and conditions of the user's network account and network location from a NetState store 920; initiating TuneUp ticket number 921; operating a Perception::TuneUp Engine circuit to determine at least one likely description of the user's perceived dissatisfaction which could be ameliorated by at least one proposed change to network settings or device configuration (DeltaState) 930; and transmitting to a TuneUp agent operable on said mobile user device for agreement, rejection, or continuation, the description and first proposed change (DeltaState) determined by the Perception::TuneUp Engine circuit 940; and receiving from said TuneUp agent, at least one of agreement to proposed DeltaState, rejection, and additional user description of perceived dissatisfaction for further operation of the Perception::TuneUp Engine circuit to determine a second proposed DeltaState 950.

In an embodiment, the method also includes the following steps: upon receiving rejection from the TuneUp agent operable on a mobile user device, closing the TuneUp ticket number 960; upon receiving additional user description of perceived dissatisfaction, continuing operation of the Perception:TuneUp Engine 930; upon receiving agreement to at least one first proposed change DeltaState, storing into a PreviousState store current network settings and device configuration 970; changing by the Network Operator or assisting the User to change network settings and device configuration as proposed 980; and setting a timer for an Evaluation Engine circuit to cause the TuneUp agent to present to the mobile user a selection of: Acceptance, to close the ticket number, Revert, to return the device to the stored Previous State and close the ticket number, and Continue TuneUp, to provide for additional user description of perceived dissatisfaction and continuing operation of the Perception::TuneUp Engine 990.

Another aspect of the invention is a system which includes a wireless communication network coupling a plurality of wireless mobile devices to a self-care server; the plurality of wireless mobile devices; the self-care server, whereby a device operator self improves performance of a device relative to other devices in the plurality of devices. Each device includes a circuit to record performance metrics and settings of the software components of the device (device state); a circuit to request analysis from a self-care server; and a circuit to transmit device state to the self-care server. Each server includes a store of device states (devstate) and network account settings (netstate) for a plurality of wireless mobile devices recorded over time; a circuit to receive network account settings and device state triggered by a request for self-care from a mobile wireless device; a circuit to select and retrieve past performance metrics, devstate and netstate for a cohort of wireless mobile devices substantially similar to the client; a circuit to select and retrieve current devstate and current netstate for subset of the cohort which has current performance metrics improved over the current performance metrics of the client; a circuit to present possible performance improvements by changing client's devstate and netstate toward settings deployed by the subset of the cohort; a circuit to adjust client's network account upon permission; and a circuit to transmit a guide to amend client's device settings. Each device also includes a circuit to receive and display at least one selectable problem description consistent with the subset of a cohort of users for which a change in device and network configuration is proposed; a circuit to indicate to the self-care server concurrence with proposed adjustments to the user's network configuration; and a circuit to receive and perform amendments to the mobile wireless device settings according to performance by the user of change proposed by the self-care server.

The objective of the system is to provide a closed loop user initiated self-care system with network assistance. Another aspect of the invention is a mobile wireless consumer communication apparatus which has a display configured to present for selection by a consumer, a list of descriptions of poor performance based on diagnosis by a centralized customer care server of the geographic location of the device and device performance and diagnostic data; and a user input circuit to record selection and additional information to more clearly describe the poor performance experienced by the consumer, whereby a consumer can self initiate a trouble ticket based on the consumer's perceived poor experience.

With this system, the consumer can self-initiate a trouble ticket based on the consumer's perceived poor experience. The consumer is presented a list of options based on the devices diagnostic performance information that categorize the areas of poor experience. The consumer can click on one option and add additional information or the consumer can create an entirely new "other" category and corresponding description.

In an embodiment, the mobile wireless consumer communication apparatus also has a circuit to cache device location, diagnostics, and performance data and to transmit said data to a centralized customer care server; a baseband processor radio circuit, an application processor circuit, a display and subscriber input device, a circuit to retrieve device information, a circuit to retrieve geographic information, a circuit to cause display of selectable requests, a circuit to capture a user selection of a selected request, and initiate a request transmission to a centralized customer care server, and a processor and memory coupled to all the above.

Another aspect of the invention is a mobile wireless client device apparatus enabled for Tap-once care, the apparatus having a baseband processor radio circuit, an application processor circuit, a display and subscriber input device, a circuit to retrieve device information, a circuit to cache device diagnostics and device performance data, a circuit to retrieve geographic information, a circuit to display selectable requests, a circuit to capture a user selection of a selected request, and initiate a request transmission to a centralized customer care server, and a processor and memory coupled to all the above.

Another aspect of the invention is a network which couples the client devices to a server which includes a non-transitory data storage medium storing information for a plurality of wireless service subscribers; a receiving component for receiving a request to open a care ticket for a first wireless service subscriber, a component that retrieves from the non-transitory data storage medium information for the first said subscriber; and an automatic care component that finds best matching solution based on similarity or dissimilarity of the first wireless service subscriber with the plurality of other subscribers, and transmits said solution to the first said subscriber, whereby a customer may self-initiate a care ticket and care process and receive at a mobile wireless communication apparatus, a care ticket number and a best matching solution among information previously stored by a plurality of other customers.

A server is coupled to the wireless devices to receive the customer initiated care ticket and that find the best matching solution. The server enables the user to directly generate a care ticket and start the care process by providing a customer care ticketing component; and a single-action care component; a data storage medium storing information for a plurality of users; a receiving component for receiving a request to open a care ticket, the request comprising an indication of one of the plurality of users; and a component that retrieves from the data storage medium information for the indicated subscriber and that uses the retrieved information to open a care ticket for the indicated subscriber for the reported request; and an automatic care component that finds best matching solution in accordance with the request captured by the care component; and a notification system to send the best matching solution to the client.

In embodiments the user device has a circuit to receive at least one best matching solution from a centralized customer care server; and a circuit to display at least one selectable action. The options are a number of choices for resolving the issue, for example a) Remove an App, b) turn off wifi.

The device also receives network side fixes from the server and presents the solution options to the consumer. Upon selection, the device guides the user through fixing device issue such as click to change settings, or click to remove app.

Afterward, the device presents displays that ask the user if the fix resolves the issue. If so then done, else the process continues and may resume finding solutions.

Applicant discloses a system for supporting a plurality of mobile user devices which utilize a wireless communication network provisioned and maintained by a network operator (NETOP). Each of the user accounts has settings and selections which control access to network resources. These values change from time to time as the network is improved and maintained. The history of these values for each of the users is stored within a NetState store. There is also a periodic packaging and uploading of device measurements and configurations. The history of the status of each device is also stored within a DevState store. Upon user selection, the current values of measurements and configurations within a cache of a device may be uploaded as well. In addition, all of the descriptions of user dissatisfaction from every user is stored in a UserPerception store.

Each mobile user device, which contains a device state cache also has a TuneUP agent circuit through which the user may add description of a perceived problem and trigger a TuneUp operation. The system uses the stored data of device states and of network states to respond to a TuneUp trigger from one of the User Devices. All of the stores are accessible by a Self-Care TuneUp apparatus.

Using the Network State and the Device State a Perception::TuneUp Engine provides a likely description of the User Perception and by comparing the present Device and Network State with all the stored Network States and Device states, offers one or more changes to network settings or device configurations. Several choices are presented to the User including, adding more description in order to continue the TuneUp process. Or, the user may reject both the description and the proposed change. Or, the user may agree to the description and at least one of the proposed changes.

When the circuit receives the acceptance, a Delta State Engine circuit stores the current state incase it needs to be reused. Then the Network Operator changes network settings or the system assists the user in making changes to the device configuration. The user is offered an evaluation period, such as hours, days, or weeks which is used to set a timer. When the evaluation period is complete, an Evaluation Engine presents a selection including the following:

The user may select Accept the changes, which closes the ticket number. The user may select Revert, which causes the device and network settings to be returned to the prior values and closes the ticket number. The user may select continue the TuneUp process by providing additional description of the perceived problem.

The present application is distinguished from conventional systems by placing the enduser in control and enabling his or her prosecution of perceived dissatisfactions by utilizing the history of a cohort of mobile device perceptions, network states, and device states.

The user initiates the process from a TuneUp agent circuit within the mobile user device. The method of operation responds by receiving a device state, user description, and a trigger from a mobile user device coupled to wireless communication network.

Upon receiving the user's trigger, the system performs reading the present settings and conditions of the user's network account and network location from a NetState store.

Every user has a network account with which is associated settings, selections, defaults, and variables determined by services provisioned to the user and the network channel associated with the user's location. These may over time or degradation have diverged from optimal values. Substantially similar users in comparison may reveal the divergences more dramatically.

When a trigger has been received and NetState data has been retrieved, the method continues by initiating a unique TuneUp ticket number, which is associated with the corresponding TuneUp ticket. This TuneUp ticket will be closed by the user's future selections. As changes converge toward a satisfactory resolution, the TuneUp ticket tracks each evolution.

Although there is a first time for everything, subsequently, a perceived dissatisfaction may be determined to correspond to a network setting, a device configuration, or a combination. In that case, a description of the user's perceived dissatisfaction is offered by a Perception::TuneUp Engine along with a proposed change or set of changes. The operable component of the system suggests at least one likely description of the user's perceived dissatisfaction which could be ameliorated by at least one proposed change to network settings or device configuration (DeltaState). If there is no precedent or similar circumstance, a Carrier Representative or Tiered Support Staff may heuristically make a suggestion.

Whether by automation or human intervention, the method then transmits to a TuneUp agent operable on said mobile user device for agreement, rejection, or continuation, the description and first proposed change (DeltaState) determined by the Perception::TuneUp Engine circuit. It has not been necessary for the user to initiate the TuneUp with a description. If the user finds the system's description accurate, then he or she may agree to both the description and to at least one of the proposed changes to network settings or to device configuration.

The user may also reject the description and/or begin providing description by text, voice, or selection from a menu. Likely selections are offered based on the current network settings and device configuration. This increases the productivity of the user in describing the problem by suggesting vocabulary that is precise and less picturesque or inflammatory. Responsive to the user's selection, the system may continue analyzing perceptions, network state, and device state to find a better solution which offers a second proposed DeltaState.

The issue may be resolved in two ways. Upon receiving a user's simple rejection from the TuneUp agent operable on a mobile user device, closing the TuneUp ticket number. Upon receiving additional user description of perceived dissatisfaction, continuing operation of the Perception::TuneUp Engine. Upon receiving user's agreement to at least one first proposed change DeltaState, the system first stores into a PreviousState store current network settings and device configuration in case the proposed change is not an improvement. Then, either changing by the Network Operator or assisting the User to change network settings and device configuration as proposed. This includes navigating the settings menu hierarchy so the user can easily update values. And then, the system enables the user to set a timer for an Evaluation Engine followup. This circuit causes the TuneUp agent to present to the mobile user a selection of: Acceptance, to close the ticket number, Revert, to return the device to the stored Previous State and close the ticket number, and Continue TuneUp, to provide for additional user description of perceived dissatisfaction and continuing operation of the Perception::TuneUp Engine. Thus the system places the user at the center of initiating and ending the process, agreeing to a description or providing further details, and accepting, and implementing or rejecting changes to his or her device and network settings.

Figure 11:
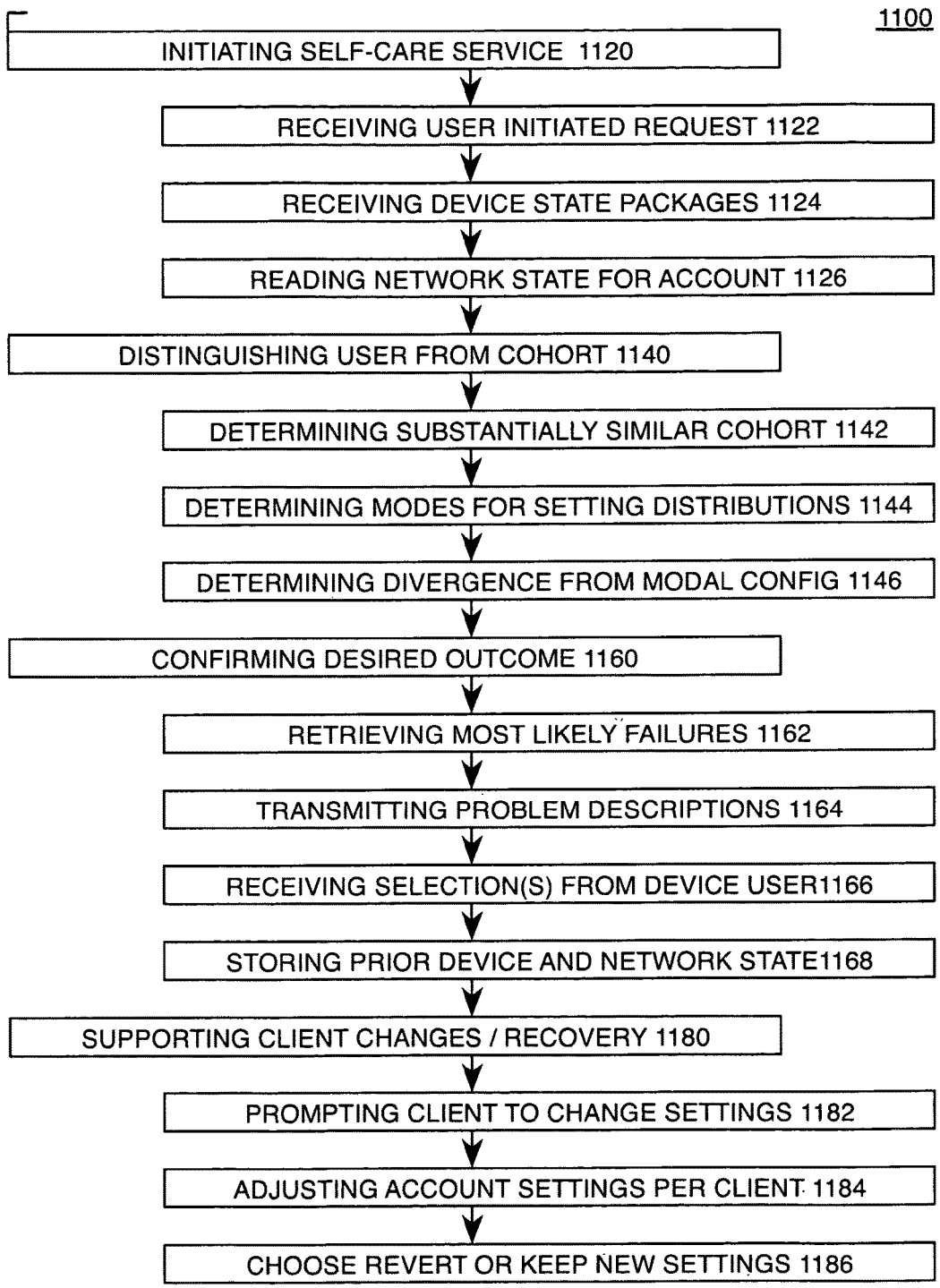
FIG. 11-12 are flowcharts of a method at a server.

Referring now to FIG. 11 another aspect of the invention is a method 1100 to cause by computer executable instructions encoded in a non-transitory medium, operation of a self-care server to perform: initiating Self-care service Request 1120; distinguishing user from cohort 1140; confirming desired outcome with client 1160; and supporting client trial changes and recovery 1180; wherein initiating Self-care service Request includes: receiving user initiated request for assistance 1122; wherein distinguishing user from cohort includes: determining cohort of substantially similar user population for client 1142; wherein confirming desired outcome with client includes: retrieving expectation failures associated with divergences 1162, and transmitting selectable problem descriptions to client display 1164; and wherein supporting client trial changes and recovery includes: transmitting prompts to client to converge device settings 1182. In an embodiment, initiating a self-care request also includes: receiving device state 1124; and reading network state for user account 1126. In an embodiment, distinguishing client from cohort also includes: determining modes for distribution of cohort settings 1144; and determining divergences from "modal" configuration of client configuration 1146. In an embodiment, confirming desired outcome with client also includes: receiving one or more agreement selections from the mobile device 1166; and storing prior device state and network state 1168. In an embodiment, supporting client trial changes and recovery also includes: upon client concurrence, adjusting network account settings 1184; and upon a trigger offering to revert or continue operation with new settings 1186.

Figure 12:
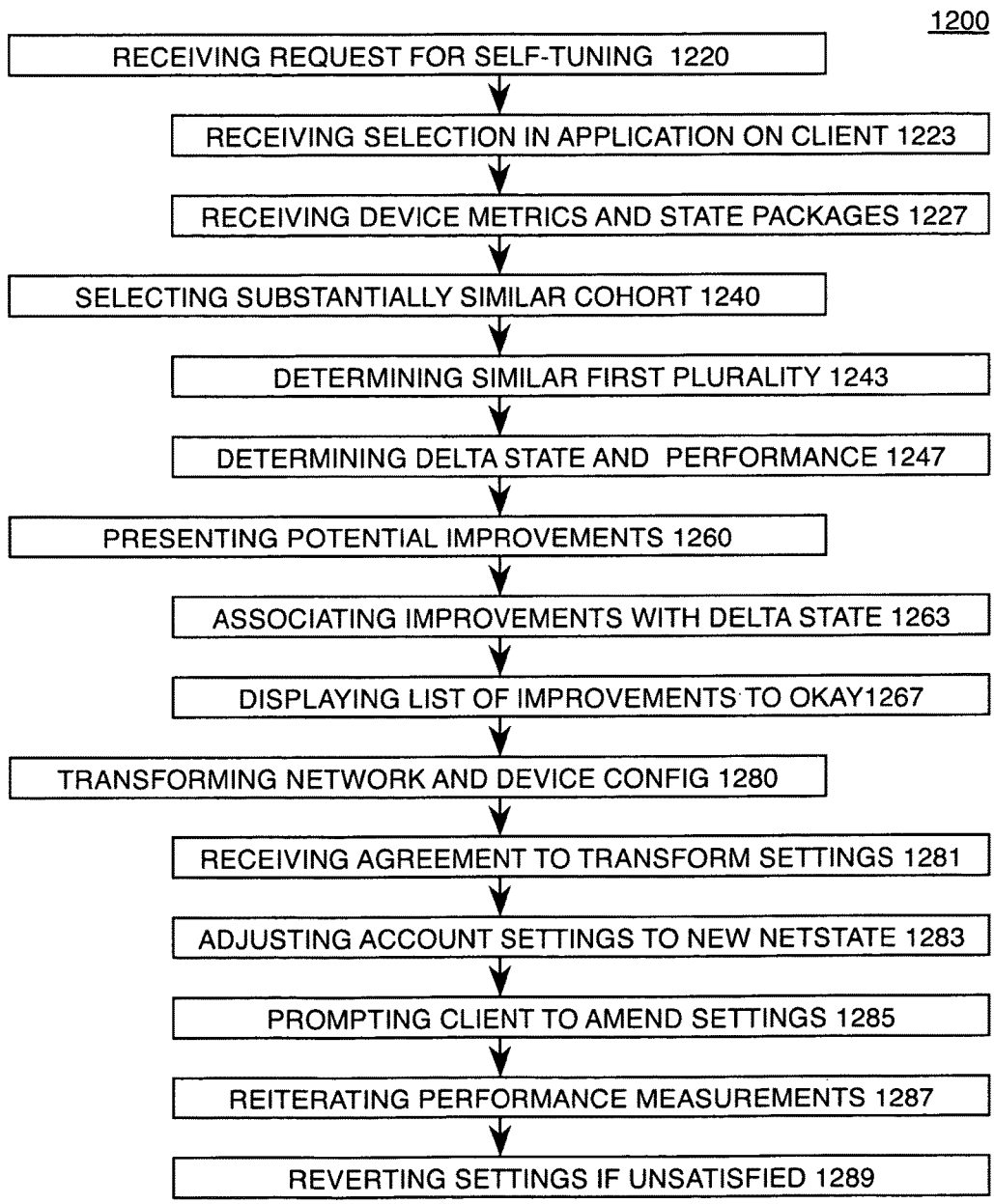

Referring now to FIG. 12, another aspect of the invention is a method for operation of a customer service self-care server 1200, the method including steps performed by a processor according to computer executable instructions encoded in non-transitory media: receiving a request from a client mobile wireless device 1220; receiving a selection on an application installed on the device 1223; receiving a package of metrics and device state 1227; selecting a cohort of substantially similar devices 1240; determining a first plurality of devices whose past devstate and netstate are substantially similar to current configuration of client device 1243; determining a subset of first plurality whose current devstate and netstate are different and whose performance has improved in some way 1247; presenting potential performance improvements 1260; associating improvements in performance with changes in devstate and netstate in the subset of first plurality 1263; displaying selectable list of improvements to client operator to obtain agreement 1267; transforming a network account and its device configuration 1280; receiving from client operator agreement to transform account and configuration 1281; adjusting server-side network account setting to new netstate 1283; prompting client user to amend settings of device 1285; reiterating performance measurements 1287; and reverting settings if performance unsatisfactory 1289.

CONCLUSION

The present invention is easily distinguished from conventional customer support system by being data driven rather than symptom driven. Based on analysis of how a particular user and device diverges from a norm, one or more possible failed expectations is displayed to the user which are not global categories but are tailored to the user's local configuration. If one matches, the remediation may be to adjust settings under user control toward those in use by others doing similar things in a similar network or geographic location.

This Tap-once-Care system is novel because the subscriber's service request is automated with an Application that streamlines the service request, including identification of the problem and attaching cached analytics that provide key diagnostics for determining the root cause of the problem and corrective action. Furthermore, the automated and streamlined ticket creation and submission standardizes the service ticket and diagnostic information and this Subscribers service request may subsequently be correlated with similar localized service requests in order to determine the root cause and corrective action. The Tap-once-Care system automates the collection of diagnostic information (i.e., cached analytics) and removes the subscriber from interactions that can be automated. The subscriber's interaction is only needed to approve of the results rather than collect information. This process saves time and effort on the subscriber and customer care representative by improving efficiency, accuracy. Customer service is improved by eliminating manual and verbal steps.

In embodiments, the invention comprises a method for supporting users of wireless device with a Tap-once-care service comprising: under control of a client system, displaying user selectable service request choices on a mobile device; and in response to a single user action, sending a request to initiate customer care process along with mobile device identifiers (in an embodiment, directory number, device ID, power-on time, battery charge), care request choices and device configuration information to a care server system; under control of a single-action care component of the server system, receiving the request; retrieving additional information previously stored for the subscriber identified by the identifier in the received request; and generating a care ticket to contain the request related data obtained from the client for the customer; and notifying subscriber that the reported request being captured and worked on; whereby the customer care request is captured with detailed and accurate information to describe the request without using a traditional customer-call-CSR model (i.e. a subscriber calling Customer Service Representative via phone to describe a request encountered on a mobile device).

In an embodiment the displaying of information includes displaying information indicating the single action. In an embodiment the single action is clicking a button. In an embodiment, a subscriber does not need to explicitly identify him or her self when sending a customer care request.

An other aspect of the invention is embodied in a client apparatus for requesting customer care which uses circuits, processors, and software to provide: an identifier (in an embodiment one of a directory number or an IMEI) that identifies a customer; a display component for displaying service quality or device performance; a single-action care-requesting component that in response to performance of only a single action, sends a request to a care server system to report the request and requesting for customer care, the request including the identifier so that the server system can locate additional information needed to capture the request accurately and so that the care server system can generate a care ticket with detailed request description based on data obtained from the client system. In an embodiment, display component is a mobile application that has access to a software API to obtain service quality and device performance data. In an embodiment, the predefined action is operating on a user interface of a mobile device.

An other aspect of the invention is a server for generation of a care ticket and start care process comprising: a customer care ticketing component; and a single-action care component comprising: a data storage medium storing information for a plurality of users; a receiving component for receiving a request to open a care ticket, the request comprising an indication of one of the plurality of users; and a component that retrieves from the data storage medium information for the indicated subscriber and that uses the retrieved information to open a care ticket for the indicated subscriber for the reported request. In an embodiment, the server also includes: an automatic care component that finds best matching solution in accordance with the request captured by the care component; and a notification system to send the best matching solution to the client. In an embodiment, the request is sent by a client in response to a single user action being performed.

An other aspect of the invention is a mobile wireless client device apparatus enabled for Tap-once care, which includes: a baseband processor radio circuit, an application processor circuit, a display and subscriber input device, a circuit to retrieve device information, a circuit to retrieve geographic information, a circuit to display selectable requests, a circuit to capture a user selection of a selected request, and initiate a request transmission to a centralized customer care server, and a processor and memory coupled to all the above. In an embodiment, the client apparatus also has a circuit to cache analytics in an embodiment, device diagnostics and device performance data.

An other aspect of the invention is a computer-implemented method for operation of a mobile wireless client device: displaying a selectable array of service requests; receiving a user selection of a service request; retrieving device information; retrieving geographic information; transmitting device information and geographic information to a centralized customer service server with the selected service request; receiving a service ticket number associated with the service request from the centralized customer service server: and displaying a service ticket number, an associated service ticket status, and a service ticket resolution. In an embodiment, the method further comprises: receiving information on service ticket requests from other users in the same geographic area; and receiving a user selection to select as ticket resolution from one of discard the service ticket number and retain the service ticket number.

Another aspect of the invention is a method for operation of a centralized customer care server communicatively coupled to a plurality of mobile wireless client devices, the method comprising: receiving from a transmitting mobile wireless client device a request type; receiving from the transmitting mobile wireless client device location id, device status, and application information coincident with the request type; storing in non-transitory media a computer readable record of the request type, the device status, and the application information as a service request, generating a service ticket number and service request report; transmitting the service ticket number and service request report to a service provider host system; and transmitting the service ticket number to the transmitting mobile wireless client device.

In an embodiment the method also includes: determining an immediate probable cause candidate by correlating a first service request with at least one other user in a location id which is substantially in the same geographical area and having substantially similar device status and application information and a previously determined probable cause; transmitting the immediate probable cause to the mobile wireless client device; and receiving a user selection to continue the service ticket or discard the service ticket.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Figure 10:
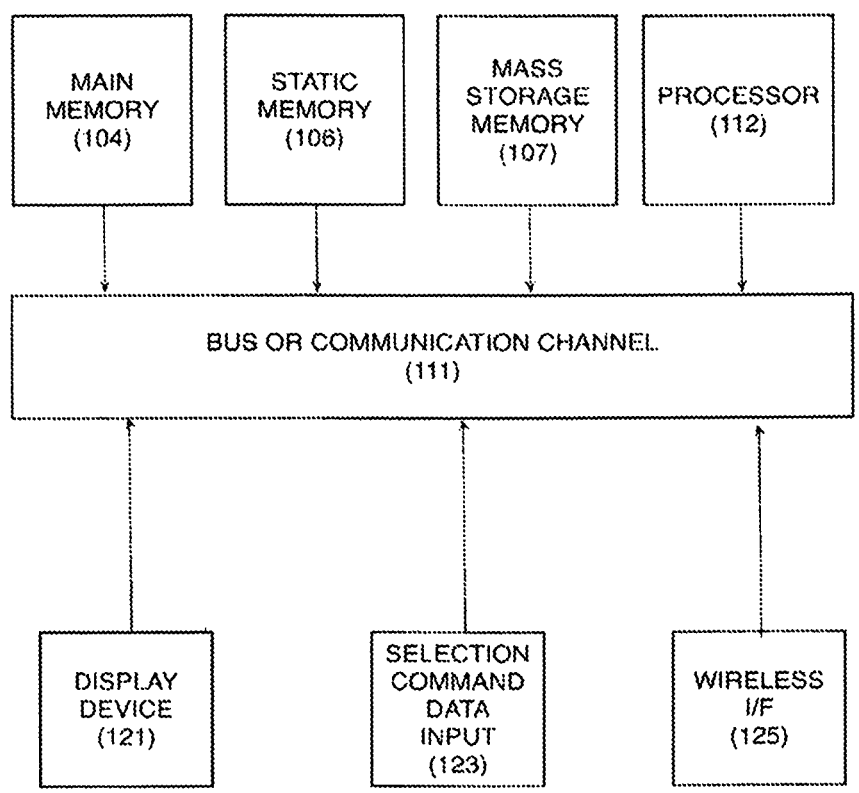
FIG. 10 is a block diagram of a processor.

FIG. 10 illustrates an exemplary programmable processor comprising a bus or communication channel 111 coupling main memory 104, static memory 106, mass storage memory 107, and a processor circuit 112 for executing instructions, and in embodiments at least one interface to couple a display device 121, a selection command data input 123, and/or a wireless interface 125.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

A number of embodiments of the invention have been described. Nevertheless, it will be understood that various modifications may be made without departing from the spirit and scope of the invention. For example, other network topologies may be used. Accordingly, other embodiments are within the scope of the following claims.

The invention claimed is:

1. A method for operation of a customer service self-care server comprising:
receiving a request from a mobile wireless device;
receiving a selection on an application installed on the mobile wireless device;
receiving a package of metrics and device state information from the mobile wireless device;
selecting a cohort of substantially similar mobile wireless devices by:
comparing a current configuration of the mobile wireless device with a past devstate and netstate of each of a population of mobile wireless devices to identify a first subset of mobile wireless devices whose past devstate and netstate are substantially similar to the current configuration of the mobile wireless device;
selecting the first subset of mobile wireless devices for further analysis; and
comparing a current configuration of the mobile wireless device with a current devstate and current netstate of the mobile wireless devices in the first subset of mobile wireless devices to identify a second selected subset of mobile wireless devices (i) whose respective past devstate and netstate are substantially similar to the current configuration of the mobile wireless device and (ii) whose current respective devstate and netstate are different from the current configuration of the mobile wireless device, the second selected subset defining the cohort;
transmitting information concerning potential performance improvements; and
transforming a network account and its device configuration.

2. The method of claim 1 wherein transmitting information concerning potential performance improvements comprises:
associating improvements in performance with changes in devstate and netstate in the mobile wireless devices included in the cohort; and
transmitting a list of selectable improvements.

3. The method of claim 1 wherein transforming a network account and its mobile wireless device configuration comprises:
receiving a command to transform account and configuration.

4. The method of claim 1 wherein transforming a network account and its mobile wireless device configuration comprises:
adjusting server-side network account setting to new netstate.

5. The method of claim 1 wherein transforming a network account and its mobile wireless device configuration comprises:
transmitting a prompt to amend settings of the mobile wireless device.

6. The method of claim 1 wherein transforming a network account and its mobile wireless device configuration comprises:
reiterating performance measurements.

7. The method of claim 1 wherein transforming a network account and its mobile wireless device configuration comprises:
reverting settings by accessing a stored prior state of the mobile wireless device.

8. The method of claim 1 further comprising:
generating and transmitting a service ticket number that corresponds to the request received from the wireless mobile device; and
receiving either a command to continue the service ticket, or a command to discard the service ticket.

9. The method of claim 3 further comprising adding transformation information concerning a network account and mobile wireless device configuration to a history of netstates and devstates of the mobile wireless devices in the cohort.

10. The method of claim 1 wherein a new cohort is selected each time that a request is received from a mobile wireless device.

11. A non-transitory storage medium having stored therein computer-executable instructions which, when executed by one or more hardware processors, perform the following processes:
receiving a request from a mobile wireless device;
receiving a selection on an application installed on the mobile wireless device;
receiving a package of metrics and device state information from the mobile wireless device;
selecting a cohort of substantially similar mobile wireless devices by:
comparing a current configuration of the mobile wireless device with a past devstate and netstate of each of a population of mobile wireless devices to identify a first subset of mobile wireless devices whose past devstate and netstate are substantially similar to the current configuration of the mobile wireless device;
selecting the first subset of mobile wireless devices for further analysis; and
comparing a current configuration of the mobile wireless device with a current devstate and current netstate of the mobile wireless devices in the first subset of mobile wireless devices to identify a second selected subset of mobile wireless devices (i) whose respective past devstate and netstate are substantially similar to the current configuration of the mobile wireless device and (ii) whose current respective devstate and netstate are different from the current configuration of the mobile wireless device, the second selected subset defining the cohort;
transmitting information concerning potential performance improvements; and
transforming a network account and its mobile wireless device configuration.

12. The non-transitory storage medium of claim 11 wherein transmitting information concerning potential performance improvements comprises:
associating improvements in performance with changes in devstate and netstate of the mobile wireless devices included in the cohort; and
transmitting a list of selectable improvements.

13. The non-transitory storage medium of claim 11 wherein transforming a network account and its mobile wireless device configuration comprises:
receiving a command to transform a network account and mobile wireless device configuration; and
adding transformation information concerning a network account and mobile wireless device configuration to a history of netstates and devstates of the mobile wireless devices in the cohort.

14. The non-transitory storage medium of claim 11 wherein transforming a network account and its mobile wireless device configuration comprises:
adjusting server-side network account setting to new netstate.

15. The non-transitory storage medium of claim 11 wherein transforming a network account and its mobile wireless device configuration comprises:
transmitting a prompt to amend settings of the mobile wireless device.

16. The non-transitory storage medium of claim 11 wherein transforming a network account and its mobile wireless device configuration comprises:
reiterating performance measurements.

17. The non-transitory storage medium of claim 11 wherein transforming a network account and its mobile wireless device configuration comprises:
reverting settings by accessing a stored prior state of the mobile wireless device.

18. The non-transitory storage medium of claim 11 wherein the processes further comprise:
generating and transmitting a service ticket number that corresponds to the request received from the wireless mobile device; and
receiving either a command to continue the service ticket, or a command to discard the service ticket.

19. The non-transitory storage medium of claim 11 wherein a new cohort is selected each time that a request is received from a mobile wireless device.

20. A server, comprising:
one or more hardware processors; and
the non-transitory storage medium of claim 11.

* * * * *